United States Patent
Ley et al.

(10) Patent No.: US 7,598,645 B2
(45) Date of Patent: Oct. 6, 2009

(54) STRESS DISTRIBUTING PERMANENT MAGNET ROTOR GEOMETRY FOR ELECTRIC MACHINES

(75) Inventors: Josh Ley, Erie, CO (US); Jon Lutz, Westminster, CO (US); Victor Chieduko, Lakewood, CO (US)

(73) Assignee: UQM Technologies, Inc., Frederick, CO (US)

( * ) Notice: Subject to any disclaimer, the term of this patent is extended or adjusted under 35 U.S.C. 154(b) by 260 days.

(21) Appl. No.: 11/746,125

(22) Filed: May 9, 2007

(65) Prior Publication Data

US 2008/0278021 A1 Nov. 13, 2008

(51) Int. Cl.
*H02K 21/12* (2006.01)

(52) U.S. Cl. .............................. 310/156.38; 310/156.53; 310/156.56; 310/261

(58) Field of Classification Search ............ 310/156.01, 310/156.38–156.46, 156.53–156.58, 261, 310/265
See application file for complete search history.

(56) References Cited

U.S. PATENT DOCUMENTS

| | | | | |
|---|---|---|---|---|
| 4,327,302 | A * | 4/1982 | Hershberger | 310/156.56 |
| 5,191,256 | A * | 3/1993 | Reiter et al. | 310/156.49 |
| 5,510,662 | A | 4/1996 | Tanimoto et al. | |
| 5,945,760 | A * | 8/1999 | Honda et al. | 310/156.53 |
| 6,177,745 | B1 * | 1/2001 | Narita et al. | 310/156.53 |
| 6,225,724 | B1 * | 5/2001 | Toide et al. | 310/216 |
| 6,441,524 | B2 * | 8/2002 | Kaneko et al. | 310/156.45 |
| 6,555,940 | B2 * | 4/2003 | Naito et al. | 310/156.56 |
| 6,906,444 | B2 | 6/2005 | Hattori et al. | |
| 6,984,909 | B2 | 1/2006 | Kadoya et al. | |
| 6,987,342 | B2 * | 1/2006 | Hans | 310/156.56 |
| 7,196,446 | B2 * | 3/2007 | Hans | 310/156.53 |
| 2004/0251763 | A1 | 12/2004 | Tamaki et al. | |
| 2005/0001503 | A1 * | 1/2005 | Hans | 310/156.53 |
| 2006/0170301 | A1 | 8/2006 | Masuzawa et al. | |

\* cited by examiner

*Primary Examiner*—Thanh Lam
(74) *Attorney, Agent, or Firm*—Buchanan Ingersoll & Rooney PC

(57) ABSTRACT

A rotor includes a cylindrical rotor core having an outer circumferential surface and a plurality of magnet insertion holes formed in the rotor core and arranged circumferentially at a preset angular interval about the rotational axis of the rotor core. Each hole extends in a direction parallel to the rotational axis and has a cross section of a generally elongated slit. The elongated slit is curved concave relative to the circumferential surface and has a radially inward side, a radially outward side, and two ends that are respectively spaced apart from the circumferential surface by two bridges, wherein each bridge has thinner and thicker portions that are respectively positioned near the radially inward and outward sides. One or more permanent magnets are inserted in each hole and arranged to transfer centrifugal forces acting on the magnets during operation to portions of the bridges.

30 Claims, 10 Drawing Sheets

# STRESS DISTRIBUTING PERMANENT MAGNET ROTOR GEOMETRY FOR ELECTRIC MACHINES

FIELD OF THE INVENTION

The present invention relates to an electric motor, and more particularly, to a permanent embedded magnet-type motor.

BACKGROUND

In recent years, the drive for energy efficiency and low cost motors has led to development of many types of electric motors and generators for various applications. Among the electric motors, permanent magnet synchronous motors (PMSM) are known to have high power density and efficiency. An interior permanent magnet (IPM) motor, which is a specific type of PMSM and also called permanent magnet reluctance (PMR) motor because of its hybrid ability to produce reluctance torque as well as permanent magnet torque, is one of the most prevalent types. A PMR motor includes a rotor having one or more permanent magnets embedded therein and generates a higher torque than a motor with a surface mounted magnet rotor. It is because the permanent magnets are positioned in the rotor core in such a way as to provide saliency in the magnetic circuit in the rotor core, which produces an additional reluctance torque.

During operation, each magnet embedded in the rotor core is subject to centrifugal force. In order to retain the magnets within the rotor core under the centrifugal force and also minimize flux leakage to other poles within the rotor core, narrow sections of rotor core material are often retained between the ends of a magnet pole and the outer periphery of the rotor core. These narrow sections are often called "bridges" or bridge areas. FIG. 1 shows a schematic cross sectional view of a conventional IPM motor 10 with magnets disposed in the rotor core. FIG. 2 is an enlarged view of a portion of the motor in FIG. 1. As depicted, the motor 10 includes a stator core 11 having a hollow cylindrical ring 20 and a core portion 15 formed inside the ring 20. The core portion 15 has slots 12 punched therethrough and coils 14 are wound around the slots 12. The motor 10 also includes a cylindrical rotor core 16 disposed on the inner side of the stator core 11, wherein a plurality of holes 18 are formed in the rotor core. Each hole 18 corresponds to a pole, extends through in the axial direction, and has a U-shaped cross section. Three permanent magnets 26 are inserted in each hole 18. Reference numeral 22 represents a magnetic-flux holding portion or center pole section that is located on the radially outward side of the hole 18. Numeral 24 represents a bridge that is disposed between the end of a magnet hole 18 and the outer periphery of the rotor 16. Reference numeral 28 denotes a rotor-shaft inserting hole.

During operation, the centrifugal force acting on the permanent magnets 26 and the centrifugal force acting on the center pole section 22 are concentrated in the bridges 24 of the rotor core 16. For this reason, the radial width of the bridges 24 must be large enough to maintain the required mechanical strength. The ring 23, which is formed of highly rigid nonmagnetic material, provides additional strength for the bridges 24. However, with this arrangement of magnets, the amount of magnetic flux leakage through the bridges 24 is a compromise with the mechanical strength of the rotor core under the centrifugal forces imparted by rotation. Two types of flux leakages occur through the bridge areas 24 and need to be reduced; 1) the flux leakage from the permanent magnets 26 needs to be reduced so that more of the magnet flux is allowed to link the stator core 11, thereby increasing the magnetic repulsion/attraction torque, 2) flux produced by the coils 14 and induced in the rotor core 16 at the direct-axis rotor position also needs to be minimal in leakage across the bridges 24 so as to increase the reluctance torque produced by the motor 10. A difficulty in the conventional motor 10 may be that the bridge portions 24 need to be made thick to meet the mechanical strength requirement at the expense of a higher flux leakage that leads to a lower torque production. Conversely, thinner bridges lead to a reduction in rotor strength limiting the speed capability of the motor 10. This trade-off relationship between the mechanical strength and magnetic flux leakage has limited the development of higher-speed, higher torque motors.

U.S. Pat. No. 6,906,444 discloses various types of rotors configured to address the trade-off issue. FIGS. 3 and 4 show schematic transverse cross sectional diagrams of rotor cores described in the '444 patent. The rotor core 34 in FIG. 3 includes a plurality of poles, wherein each pole has three trapezoidal shaped magnet holes 35 and three permanent magnets 36 inserted in the magnet insertion holes 35. Both the holes 35 and permanent magnets 36 have prismatic shapes. Between neighboring holes 35 there are disposed ribs 37 that prevent the centrifugal force acting on the permanent magnets 36 and center pole section 39 from being concentrated in the bridges 38, thereby enhancing the rotational speed limit without increasing the radial width of the bridges 38. However, the multiple magnet insertion holes 35 and ribs 37 increase magnetic flux leakage between neighboring poles and reduce torque production, i.e., a higher rotational speed may be obtained at the expense of torque reduction.

The rotor core 40 in FIG. 4 includes U-shaped permanent magnet insertion holes 43 and permanent magnets 44 inserted in the holes. The rotor core 40 also includes an annular nonmagnetic ring 42 that covers the outer peripheral portion of the rotor core. The ring 42, which is formed of highly rigid nonmagnetic material, is used in place of bridges or in addition to the bridges. Because the annular nonmagnetic ring 42 is fitted over the outer peripheral portion of the rotor core 40, the structure is able to resist the breakage of the rotor due to the centrifugal force acting on the magnets 44 and center pole section 46 during operation. Also, the magnetic flux leakage from the center pole section 46 is reduced, thereby making it possible to obtain a high magnetic flux density in the center pole section 46. As the size of the permanent magnets 44 can be made large and the magnetic flux density produced in the center pole section 46 as well as the saliency in the rotor core 40 can increase, the overall torque can be increased. However, the disadvantage of incorporating the nonmagnetic ring 42 is that it significantly increases the manufacturing cost. Also, the gap between the rotor core 40 and stator (not shown in FIG. 4) decreases and eddy current loss may increase if the ring 42 is metallic. Thus, there is a need for low cost motors with enhanced rotational speeds, power, and torque densities.

SUMMARY

In one embodiment, a permanent magnet rotor includes: a rotor core having a generally cylindrical shape with an outer circumferential surface and a rotational axis; a plurality of magnet insertion holes formed in the rotor core and arranged circumferentially at a preset angular interval about the rotational axis, each hole extending in a direction parallel to the rotational axis and having a cross section of a generally elongated slit; the elongated slit curved concave relative to the circumferential surface and having a radially inward side, a radially outward side, and two ends that are respectively spaced apart from the circumferential surface by two bridges thereby to form a rotor center core section located circumferentially between the bridges and located radially between the radially outward side of the slit and the outer circumferential surface of the rotor core, each of the bridges having thicker and thinner portions that are respectively positioned near the radially inward and outward sides; and one or more permanent magnets inserted in each of the holes and arranged to transfer the centrifugal forces imparted on the magnets during rotation, directly to portions of the bridges reducing the transfer of the forces to the rotor center core section.

In another embodiment, an electrical motor includes: a stator having a generally hollow cylindrical shape with an inner circumferential surface and including one or more coils coupled to a power source; a rotor core positioned within the inner circumferential surface of the stator and having a generally cylindrical shape with an outer circumferential surface and a rotational axis, the outer circumferential surface being positioned coaxially with respect to the inner surface of the stator in a spaced apart relationship; a plurality of magnet insertion holes formed in the rotor core and arranged circumferentially at a preset angular interval about the rotational axis, each hole extending in a direction parallel to the rotational axis and having a cross section of a generally elongated slit; the elongated slit curved concave relative to the outer circumferential surface and having a radially inward side, a radially outward side, and two ends that are respectively spaced apart from the outer circumferential surface by two bridges, each of the bridges having thicker and thinner portions that are respectively positioned near the radially inward and outward sides; and one or more permanent magnets inserted in each of the holes and arranged to transfer centrifugal forces acting on the magnets during operation to portions of the bridges. The rotor core rotates along the rotational axis when the power source provides an electrical current to the coils.

In still another embodiment, a permanent magnet rotor includes: a rotor core having a generally cylindrical shape with an outer circumferential surface and a rotational axis; a plurality of magnet insertion holes formed in the rotor core and arranged circumferentially at a preset angular interval about the rotational axis, each hole extending in a direction parallel to the rotational axis and having a cross section of a generally elongated slit; the elongated slit curved concave relative to the circumferential surface and having a radially inward side, a radially outward side, and two ends that are respectively spaced apart from the circumferential surface by two bridges, each of the bridges having thicker and thinner portions that are respectively positioned near the radially inward and outward sides; and a center magnet and two outer magnets inserted in each of the holes, each of the center and outer magnets having a generally trapezoidal cross section, each of the two outer magnets having a first non-parallel side in contact with a non-parallel side of the center magnet and a second non-parallel side in contact with one of the bridges.

DETAILED DESCRIPTION OF THE PREFERRED EMBODIMENTS

Broadly, the preferred embodiments provide various rotor designs, more specifically, various configurations of the permanent magnet insertion holes formed in rotor cores. One or more permanent magnets are inserted in each hole that corresponds to a magnetic pole, wherein each hole is designed to relieve the bridges from carrying the full centrifugal load acting on the permanent magnets during operation of the rotor core, thereby reducing mechanical stress in the bridges. The reduction in mechanical stress allows the bridge thickness to be reduced and the magnetic flux leakage between adjacent poles to be reduced.

Figure 5:
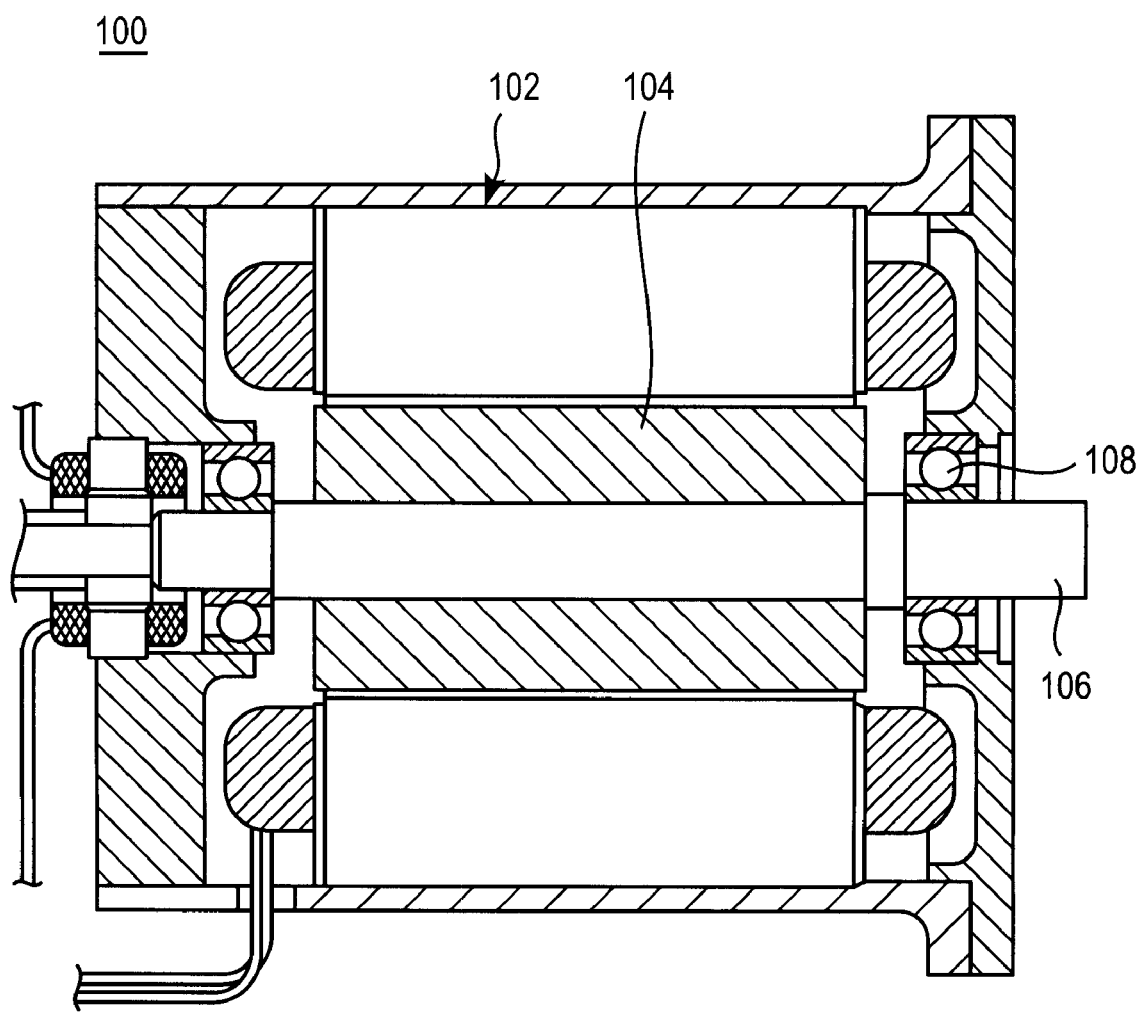
FIG. 5 shows a schematic sectional view of a motor in accordance with one embodiment.

FIG. 5 shows a sectional view of an interior permanent magnet (IPM) motor, taken along a direction parallel to the rotational axis of rotor, in accordance with one embodiment of the present invention. As depicted, the motor 100 includes a rotor core 104 disposed inside a stator core 102, and a motor output shaft 106 that rotates with the rotor core 104 along the central axis of rotation. The shaft 106 is attached to the stator core 102 by means of a bearing 108. The stator core 102 has a generally cylindrical shape and includes coils or windings coupled to a power source for providing alternating current for the coils during operation.

Figure 6:
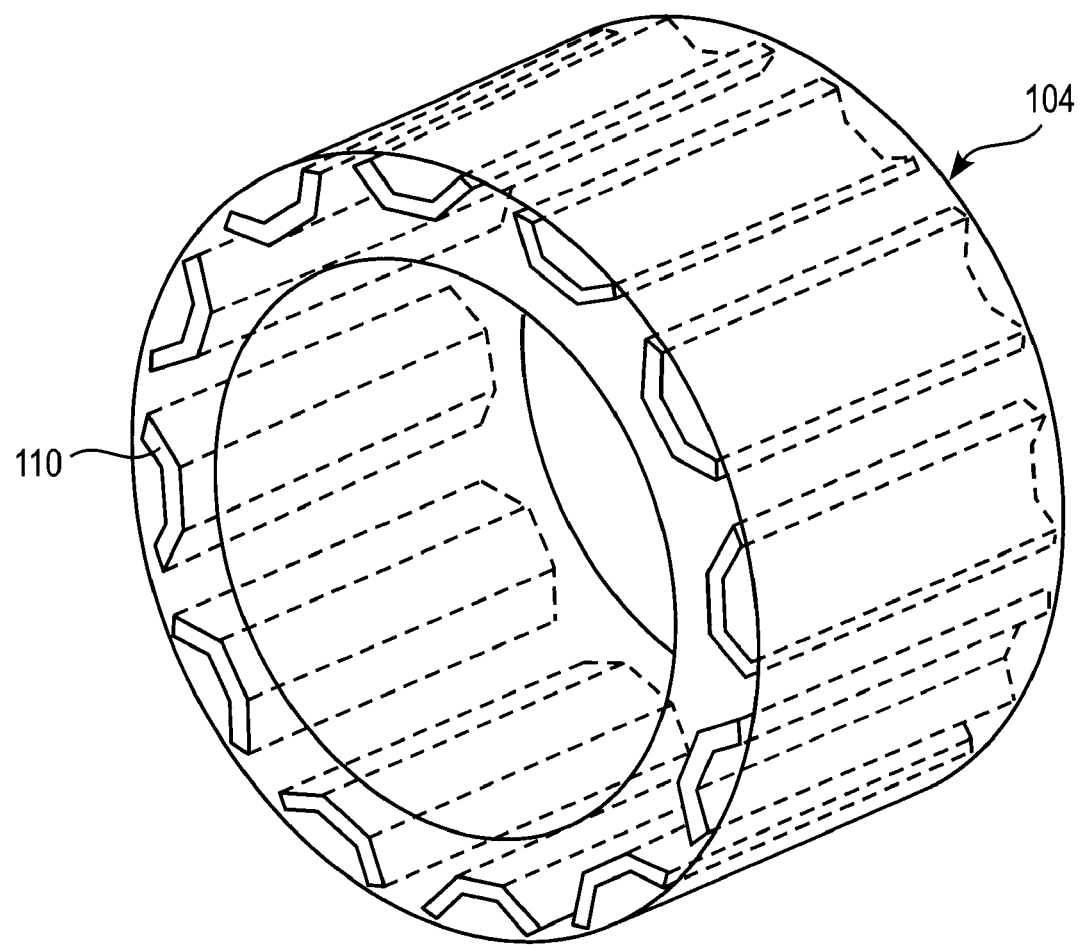
FIG. 6 shows a schematic perspective view of the rotor core in FIG. 5.

FIG. 6 shows a schematic perspective view of the rotor core 104 in FIG. 5. As depicted, the rotor core 104 includes a plurality of permanent magnet insertion slits or holes 110 arranged circumferentially at a preset angular interval about the rotational axis of the rotor core and has a generally cylindrical shape. The rotor core 104 is formed by a single member or by laminating a multiplicity of punched plates, made from material, such as, but not limited to, Fe, SiFe, NiFe, SiFeCo, and SiFeP, or any material classified as an electrical steel, a soft magnetic composite, or any other material with a magnetic permeability greater than air. Each hole 110, which corresponds to a magnet pole, has a generally U-shaped cross section and extends through the rotor core 104 in a direction parallel to the rotational axis of the rotor core, thereby forming an elongated hollow shape. It should be apparent to those of ordinary skill in the art that the rotor core 104 may have other suitable numbers of holes 110. Also, it should be apparent that the rotor core 104 may be used in other suitable types of permanent magnet motors.

Figure 7A:
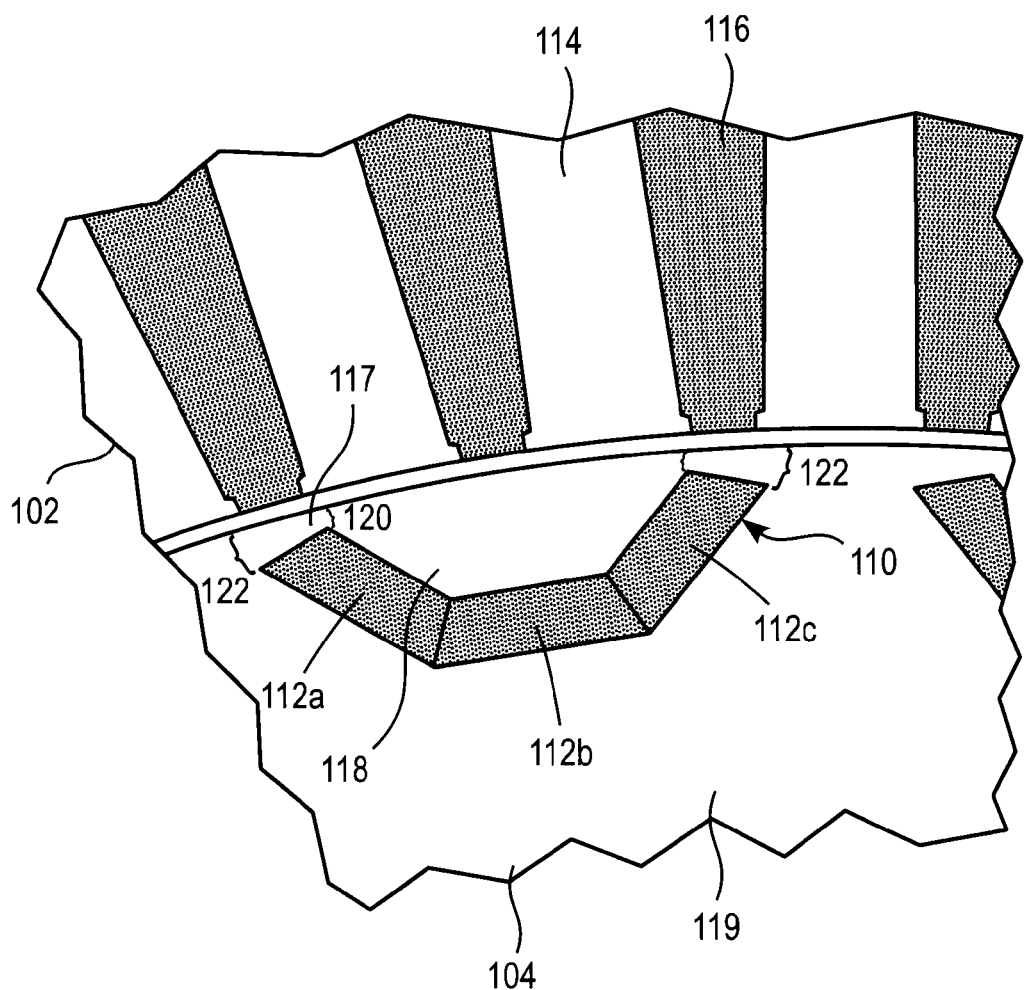
FIG. 7A shows a schematic partial cross sectional view of the motor in FIG. 6.

FIG. 7A shows a schematic partial cross sectional view of the motor 100 in FIG. 6, taken along a direction normal to the rotational axis of the rotor core 104. As depicted, three permanent magnets 112a, 112b, 112c are inserted in the hole 110 to form a permanent magnetic pole. Alternatively, the three permanent magnets 112 may be replaced by a permanent magnet having the same cross sectional shape as the hole 110. Each permanent magnet 112 has a prismatic shape, i.e., each magnet has an elongated shape with a trapezoidal cross section. The length of the magnets 112 along the rotational axis of the rotor core 104 is the same as that of the hole 110. The cross section of the magnets 112 is dimensioned such that three permanent magnets are fitted in the hole 110, preferably filling the entire space of the hole.

The stator core 102 includes teeth 114 formed along the inner periphery thereof at a preset angular interval and windings or coils 116 wound around the teeth. The coils 116 may be, for instance, three-phase windings, if a three-phase alternating current is allowed to flow through the coils 116. The rotor core 104 is caused to rotate by permanent magnetic field torque due to the interaction between the current flowing through the coil 116 and the magnetic flux of the permanent magnets 112. Also, each permanent magnet 112 tends to align itself in the minimum reluctance position relative to the magnetic field generated by the current flowing through the coils 116, thereby generating the reluctance torque that also turns the rotor core 104 with respect to the stator core 102.

The permanent magnets 112 inserted in the holes 110 change their orientation with respect to the coils 116 during spinning. Different shapes, such as a V-shape or an arc-shape, may be used as detailed in FIGS. 9-10. For the purpose of illustration, the hole 110 is assumed to have a generally U-shape in the following disclosure.

The rotor core 104 includes bridges 117, which refer to the region between the tips of the U-shaped hole 110 and the outer periphery of the rotor core 104. The bridge 117 has a non-uniform radial thickness and includes a minor bridge thickness (equivalently, minor bridge portion or thinner portion) 120 and a major bridge thickness (equivalently, major bridge portion or thicker portion) 122. Each U-shaped hole 110 accommodates three permanent magnets 112 and each magnet has a prismatic shape. The center pole section 118, which refers to a portion of the rotor core that is located circumferentially between the bridges 117 and located radially between the radially outward surface of the U-shaped hole 110 and outer circumferential surface of rotor core 104, is a region having a high magnetic flux density. Hereinafter, the term "center pole section" is used interchangeably with the term "rotor center core section."

The center pole section 118 is connected to the main central portion 119 of the rotor 104 by the bridges 117, thereby forming an integral body of the rotor core. The dimension of the U-shaped hole 110 along the outer periphery of the rotor core 104 is determined by the number of magnetic poles in the rotor core 104 as well as the interval between two neighboring teeth 114 of the stator core 102. As the centrifugal force acting on the permanent magnets 112 is transferred to the bridges 117 and the centrifugal force is proportional to the mass of the permanent magnets 112 as well as the rotational speed squared, the thickness of the U-shaped hole 110 is determined in conjunction with the material of permanent magnets 112 as well as the rotational speed limit and the magnetic flux density in the center pole section 118.

The cross section of the magnets 112a-112c are designed such that one magnet makes a tight contact with neighboring permanent magnet(s) in the hole 110 during operation, i.e., one side surface of the center magnet 112b is in contact or would be forced to be in contact with a side surface of the left outer magnet 112a under excitation from a centrifugal or radial force during operation. Likewise, the other side surface of the center magnet 112b is in contact or would be forced in contact with a side surface of the right outer magnet 112c under excitation from a centrifugal force. The centrifugal force acting on the permanent magnets 112a-112c during operation is then transmitted through the permanent magnets to some portion of the bridge between the minor and major bridge portions. Thus, the U-shaped configuration of the hole 110 allows the force transmitted to the minor bridge portion 120 to be limited to the centrifugal force acting on the center pole section 118 alone. By reducing or relieving forces transferred to the rotor center core section 118, the stress in minor bridge portions 120 will be relieved. Absent the force transmission mechanism of FIG. 7A, the centrifugal forces acting on the magnets 112a-112c would be transferred to the center core section 118 and thereby carried substantially by the minor bridge portions 120. By transferring some of the forces to bridges 117, the stress in the minor bridge portions 120 are greatly relieved.

Figure 7B:
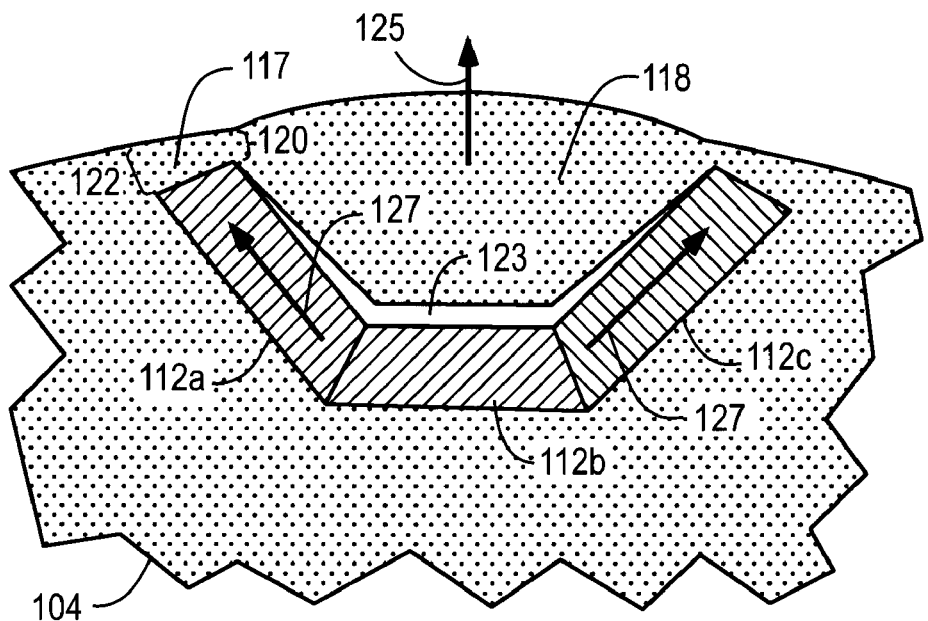
FIG. 7B shows a schematic partial cross sectional view of the rotor core in FIG. 7A during operation with deflection exaggerated.

FIG. 7B shows a schematic (not scaled) partial cross sectional view of the rotor core in FIG. 7A during operation. For the purpose of illustration, the radial deflection of the center pole section 118 is exaggerated in FIG. 7B. As depicted, the center pole section 118 is deformed to bend away from the rotational axis of the rotor 104 by the centrifugal force 125 acting on the center pole section 118, developing an air space or gap 123 between the center pole section and the magnets 112 and thereby separating the radially inward side of the center pole section 118 from the permanent magnets 112 during operation. Due to the gap 123, the centrifugal forces acting on the magnets 112 are not transmitted to the center pole section 118. Instead, the centrifugal forces are transmitted through the outer magnets 112a, 112c, as indicated by arrows 127, so that the stress due to the transmitted centrifugal force is mostly diverted to the major bridge portion 122 or some portion of the bridge between the major and minor bridge portions.

Figure 4:
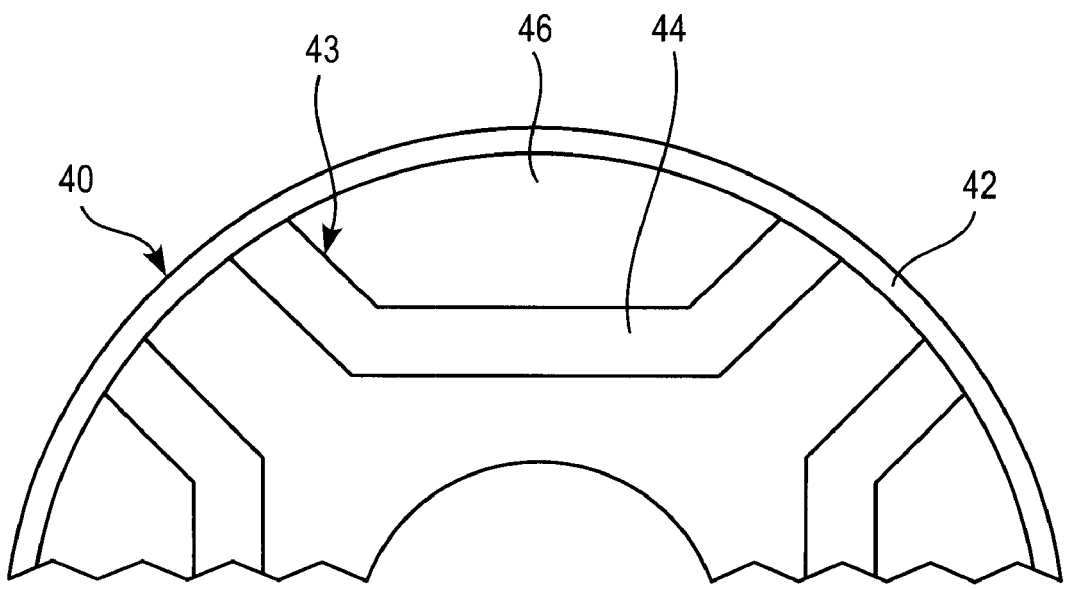

Transmitting the centrifugal force from the center magnet 112b to the outer magnets 112a, 112c directs the centrifugal force imparted on the magnets 112 away from the center pole section 118, thereby relieving the force transmitted to the minor bridge portion 120. The magnets 112 are in tight contact with each other during operation so that the centrifugal force acting on the center magnet 112b is transmitted to the outer magnets 112a, 112c. Unlike the conventional rotor 40 (FIG. 4) that requires an additional ring 42 to strengthen the bridges 24, the U-shaped cross sectional geometry of the hole 110 incorporates a way of reducing the mechanical stress in the bridge 117 by transferring the magnet's centrifugal load to the major bridge portion 122. Thus, a ring is not necessary.

The U-shaped geometry allows the magnets 112 to be in tight contact (or, equivalently locked) with each other within the rotor core during operation without imparting the full centrifugal force to the minor bridge portion 120, thereby reducing the mechanical stress in the minor bridge portion. Reducing the stress in the minor bridge portion 120 allows the minor bridge portion to be made smaller for a given rotor speed rating, thereby lessening the magnetic flux leakage and increasing the output torque of the motor 100. A smaller minor bridge portion 120 magnetically saturates with a smaller amount of flux leakage from the permanent magnets 112, preventing further flux leakage from the permanent magnets 112 or the stator windings 116. The design feature that limits the force being applied to the center pole section 118 and provides the contacting action between the magnets leads to the benefits described herein.

Figure 1:
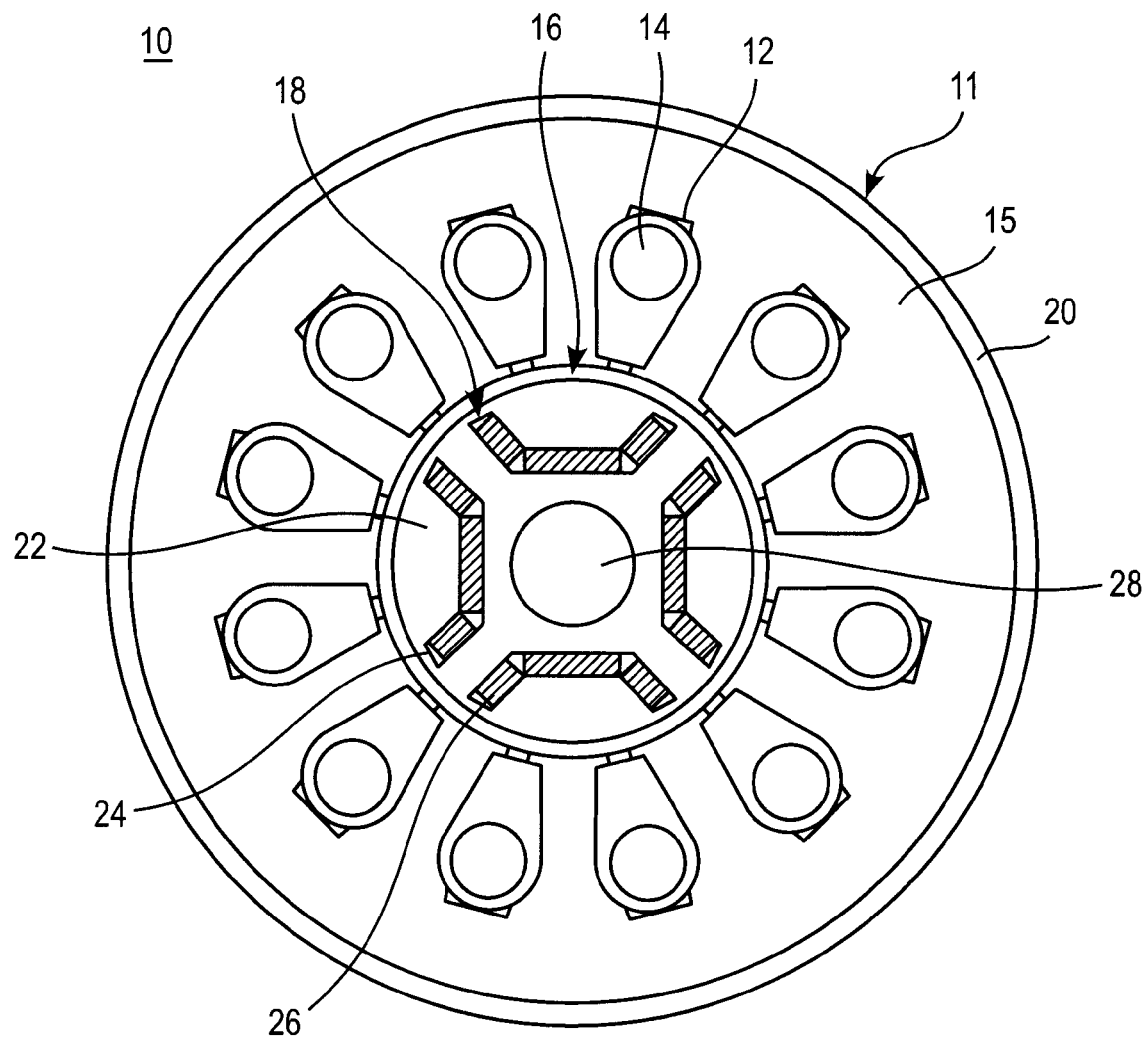
FIG. 1 shows a schematic cross sectional view of a conventional IPM motor having permanent magnets disposed in its rotor.
Figure 2:
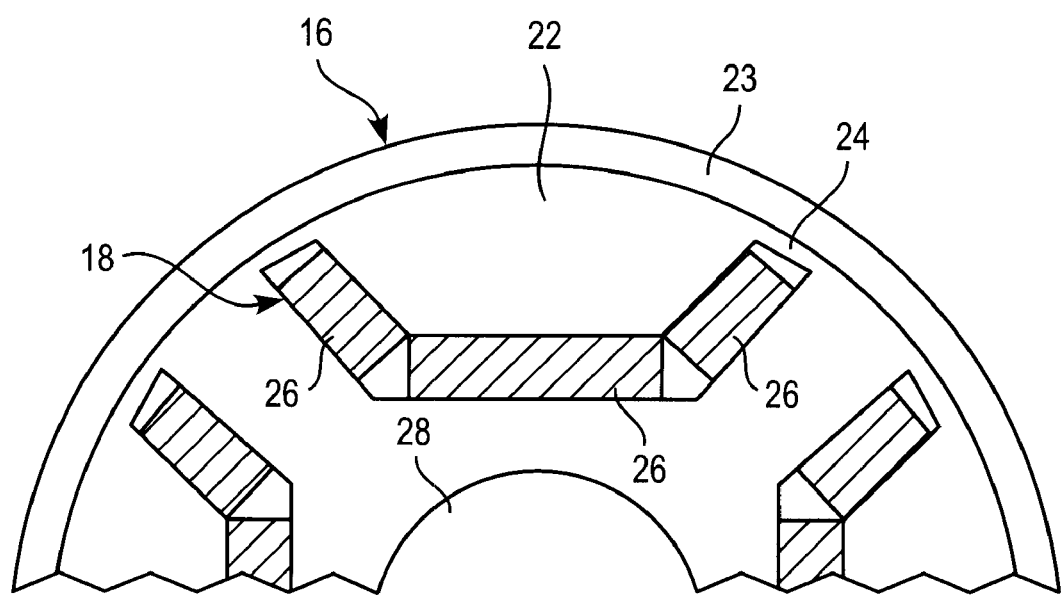
FIG. 2 is an enlarged view of a portion of the motor in FIG. 1.

As discussed with reference to FIG. 1, the conventional rotor 10 includes both an annular ring 23 and outer peripheral bridges 24 to retain the magnets 26 within a single U-Shaped magnet insertion hole 18. However, as depicted in FIG. 1, the magnets 26 are not constructed in a prismatic shape that would allow transmission of the centrifugal force acting on the magnets 26 to the outer periphery bridges 24 directly. Instead, the magnets 26 have rectangular cross sections, and therefore, the magnets 26 transmit the centrifugal force directly to the center pole section 22 during operation, increasing the mechanical stress in the bridges 24. In addition, the bridges 24 are preferably of non-uniform thickness needed to complete the necessary geometry to provide the locking action of the magnets within the core.

Figure 3:
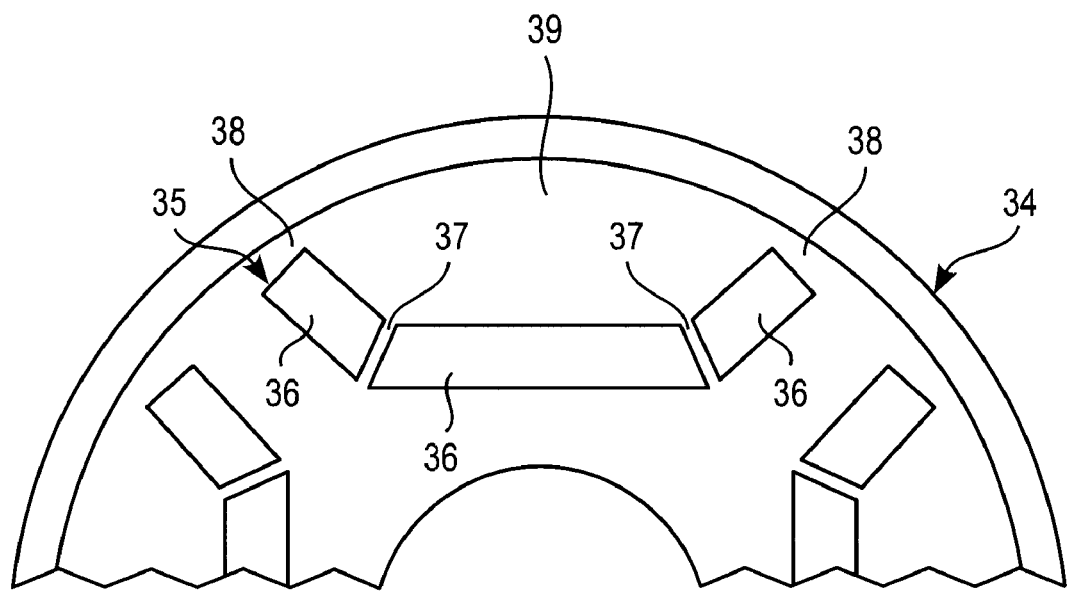
FIGS. 3 and 4 show schematic cross sectional views of rotors described in prior art.

As discussed in conjunction with FIG. 3, the previously referenced patent discloses a rotor core 34 having U-shaped magnet insertion holes 35, wherein each hole corresponds to a pole and is divided with additional bridges or ribs 37 to make multiple magnet insertion holes per pole. In contrast, the embodiment of the rotor core 104 in FIGS. 6-7A has only one hole per pole and multiple magnets 112 are fitted in the hole 110, allowing the permanent magnets 112 to contact each other and to transmit the centrifugal force exerted on the permanent magnets 112 through the permanent magnets. The U-shaped magnet insertion hole 110 can be made shallow so that the center pole section 118 has a low mass. By use of the hole configuration in FIGS. 6-7A, it is possible to obtain large torque while the motor 100 can operate at higher speeds.

Figure 7C:
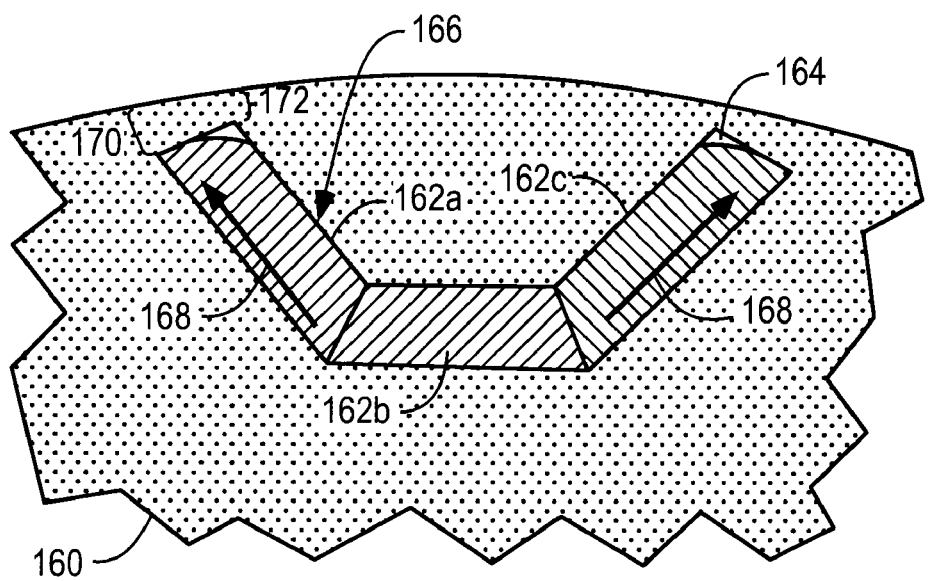
FIG. 7C shows a schematic partial cross sectional view of another embodiment of a rotor core.

FIG. 7C shows a schematic partial cross sectional view of another embodiment of a rotor core 160. The components of the rotor core 160 are similar to those of the rotor core 104, with the difference that the outer permanent magnets 162a, 162c inserted into a hole 166 have rounded corners on the minor bridge portion sides 172. The rounding of the corners generates air spaces or gaps 164 between the magnets 162a, 162c and the minor bridge portions 172 while the magnets 162a, 162c are in contact with the major bridge portions 170. Due to the gaps 164, the centrifugal forces transmitted through the outer magnets 162a, 162c in the directions of arrows 168 are mostly transferred to the major bridge portions 170, thereby relieving the stress in the minor bridge portions 172.

Figure 7D:
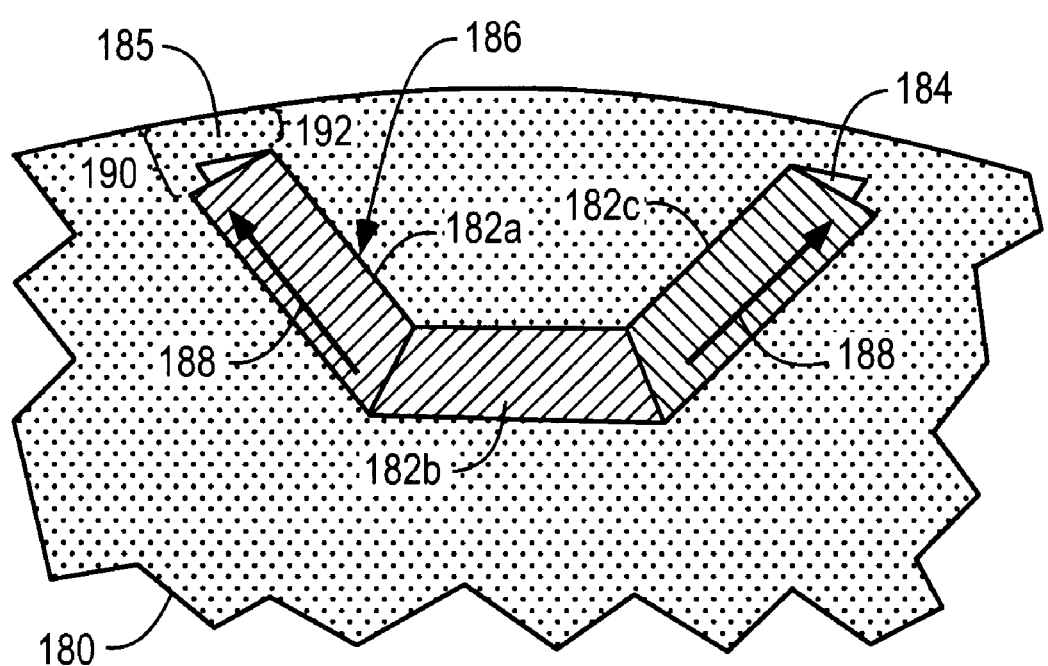
FIG. 7D shows a schematic partial cross sectional view of yet another embodiment of a rotor core.

FIG. 7D shows a schematic partial cross sectional view of yet another embodiment of a rotor core 180. The components of the rotor core 180 are similar to those of the rotor core 104, with the difference that there are recesses 184 in the bridges 185 that are open and not filled with the magnets 182a, 182c. The portions (or, equivalently, recesses) 184 are most likely air gaps or filled with structural adhesive if the magnets 182a-182c are inserted with structural adhesive. In this embodiment, the centrifugal forces transmitted through the outer magnets 182a, 182c in the directions of arrows 188 are mostly transferred to the major bridge portions 190 instead of uniformly across the bridges 185, thereby relieving the stress in the minor bridge portions 192.

A discussed above, a single magnet having the same cross sectional shape as the hole 110 may be used in place of the three magnets 112. In this case, the single magnet may have rounded corners to form gaps that are similar to the gaps 164 so that the stress in the minor bridge portions is reduced during operation.

Figure 8:
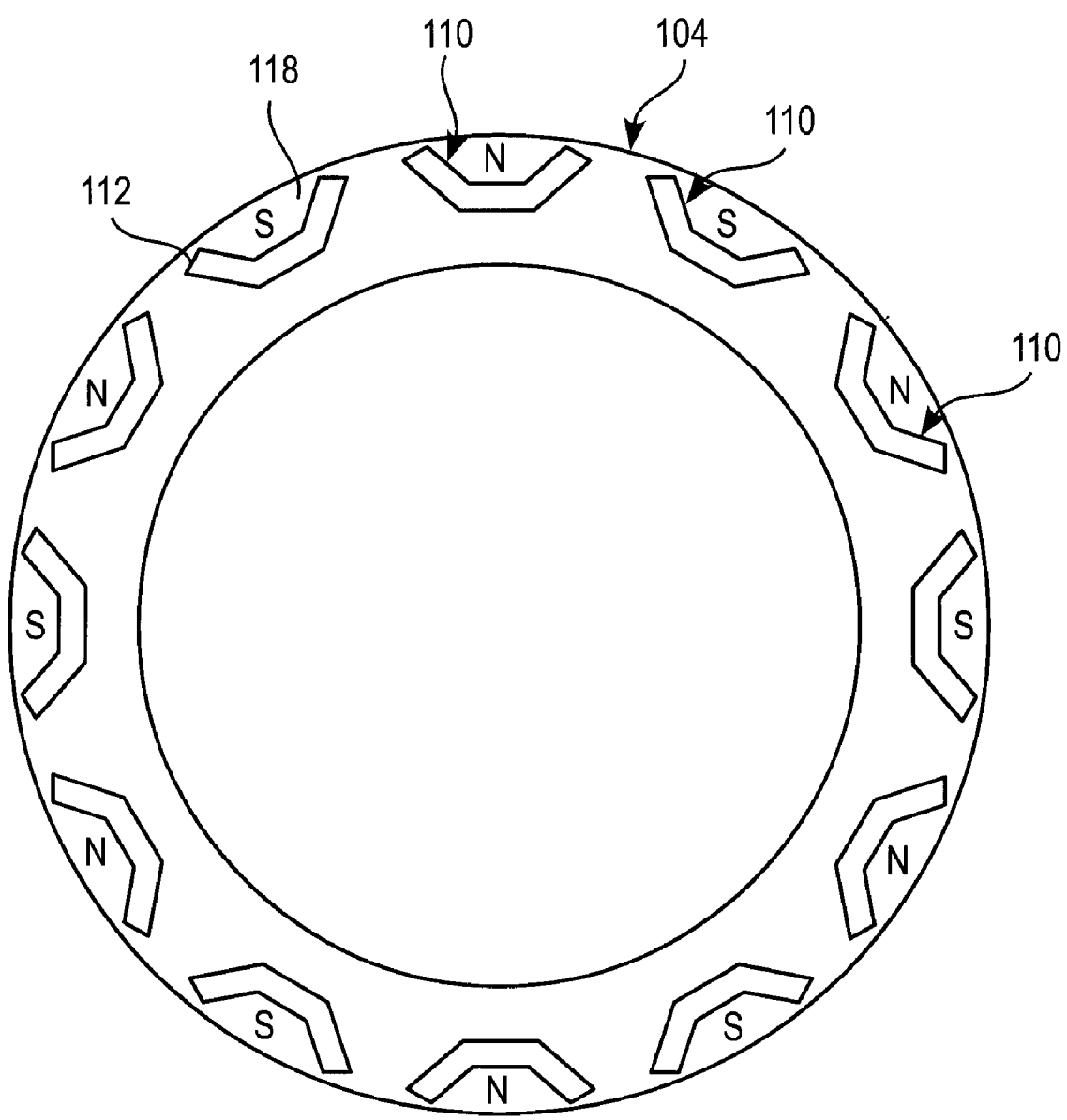
FIG. 8 shows a schematic cross sectional view of the rotor core in FIG. 6.

FIG. 8 shows a schematic cross sectional view of the rotor core 104 in FIG. 6, taken along a direction normal to the rotational axis of the rotor core. As depicted, polarities of the permanent magnets 112 of adjacent U-shaped holes 110 are arranged to be opposite to each other. The three permanent magnets 112 in each hole 110 are arranged such that the center pole section 118 surrounded by the three magnets faces the same polarity of the three permanent magnets. It is noted that twelve poles are shown in FIG. 8 for the purpose of illustration, even though other suitable number of poles may be used without deviating from the spirit of the present teachings.

Figure 9:
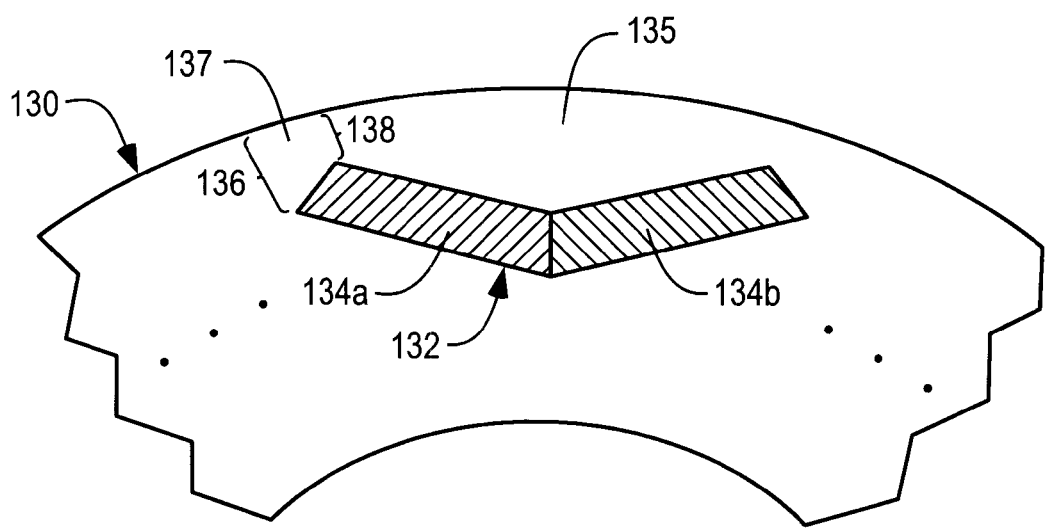
FIG. 9 shows a schematic partial cross sectional view of yet another embodiment of a rotor core.

FIG. 9 shows a partial cross sectional view of another embodiment of a rotor core suitable for use in the motor 100. As depicted, the rotor core 130 includes a plurality of magnet insertion holes 132 and permanent magnets 134a, 134b inserted in the holes. The rotor core 130 is similar to that shown in FIG. 6, with the differences that the hole 132 has a V-shape in place of a U-shape and that two permanent magnets 134a, 134b are inserted in each hole 132. Each of the magnets 134a, 134b has an elongated shape with a trapezoidal cross section. As a variation, a single permanent magnet having the same cross sectional shape as the hole 132 may be used in place of the two magnets 134a, 134b.

The two permanent magnets 134a, 134b are arranged within the hole 132 such that one magnet tightly contacts (or, equivalently interlocks) the other magnet during operation, i.e., a side surface of the left magnet 134a is in contact or would be forced to be in contact with a side surface of the right magnet 134b under excitation from centrifugal force during operation. This centrifugal force is then mostly transmitted to the major bridge portion 136 of the bridge 137 or some portion of the bridge 137 between the major bridge portion 136 and minor bridge portion 138 of the bridge. Thus, as in the cases of FIGS. 7A and 7C, the V-shaped configuration of the hole 132 allows the force transmitted to the minor bridge portion 138 to be limited to the centrifugal force acting on the center pole section 135 alone. Directing the centrifugal force imparted on the magnets 134a, 134b away from the center pole section 135 relieves the force transmitted to the minor bridge portion 138, reducing the mechanical stress in the minor bridge portion 138.

Figure 10:
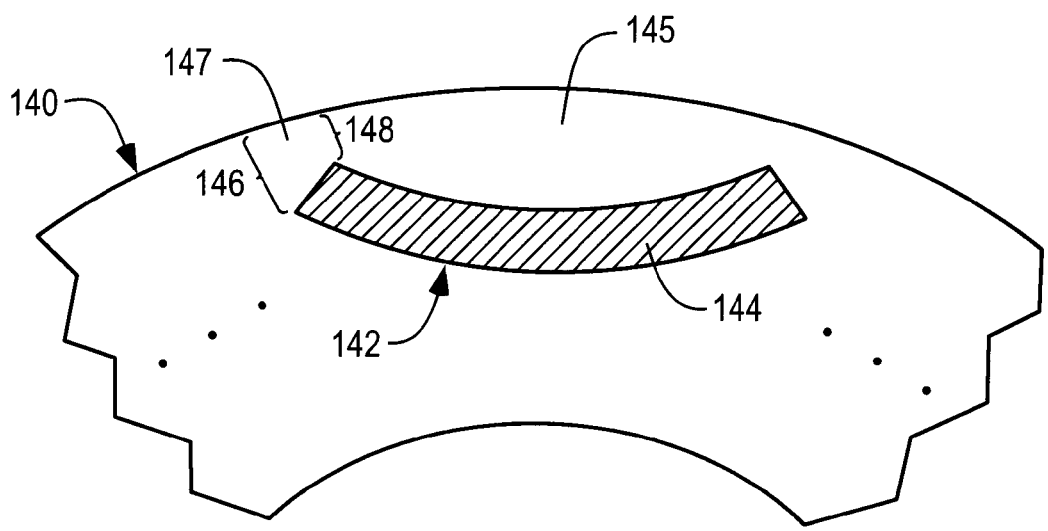
FIG. 10 shows a schematic partial cross sectional view of still another embodiment of a rotor core.

FIG. 10 shows a partial cross sectional view of yet another embodiment of a rotor core suitable for use in the motor 100. The rotor core 140 is similar to that shown in FIG. 6, with the differences that the hole 142 has an arc-shape in place of a U-shape and that each hole 142 has one permanent magnet having the same cross sectional shape as the hole 142. During operation, the radial force acting on the magnet 144 is mostly transmitted to the major bridge portion 146 of the bridge 147 or some portion of the bridge 147 between the major bridge portion 146 and minor bridge portion 148 of the bridge. Thus, as in the cases of FIGS. 7A and 7C, the arc-shaped configuration of the hole 142 allows the force transmitted to minor bridge portion 148 to be limited to the centrifugal force acting on the center pole section 145 alone. Directing the centrifugal force imparted on the magnets 144 away from the center pole section 145 relieves the force transmitted to the minor bridge portion 148, thereby reducing the mechanical stress in the minor bridge portion 148.

Figure 11:
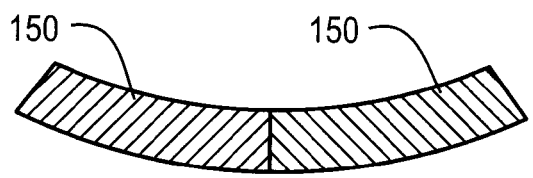
FIG. 11 shows a schematic cross sectional view of an embodiment of two permanent magnets.

FIG. 11 shows a cross sectional view of another embodiment of two permanent magnets suitable for use in the rotor 140 depicted in FIG. 10. The cross sections of the two permanent magnets 150 are dimensioned such that the magnets 150 fit in the arc-shaped hole 142 in FIG. 10 and tightly contact each other during operation. The two magnets 150 have the similar operational mechanism as the permanent magnet 144 in FIG. 10 to reduce the mechanical stress in the minor bridge portion 148.

It is noted that the magnets 134 (FIG. 9), 144 (FIG. 10), and 150 (FIG. 11) may have rounded corners to form gaps that are similar to the gaps 164 (FIG. 7C). Also, in the case where a single magnet is used in place of the two magnets 134 in FIG. 9, the single magnet may have rounded corners to form the similar gaps, reducing the mechanical stress in the minor bridge portion 137 during operation. Alternatively, the bridges 137 (FIG. 9), 147 (FIG. 10) may have recesses that are similar to the recesses 184 (FIG. 7D).

It is also noted that the permanent magnets depicted in embodiments of FIGS. 6-11 may be glued to the inner surfaces of the holes so that the permanent magnets are secured in place during operation. Conventional glues that can provide the required mechanical strength may be used.

While the invention has been described in detail with reference to specific embodiments thereof, it will be apparent to those skilled in the art that various changes and modifications can be made, and equivalents employed, without departing from the scope of the appended claims.

What is claimed is:

1. A permanent magnet rotor, comprising:
    a rotor core having a generally cylindrical shape with an outer circumferential surface and a rotational axis;
    a plurality of magnet insertion holes formed in the rotor core and arranged circumferentially at a preset angular interval about the rotational axis, each hole extending in a direction parallel to the rotational axis and having a cross section of a generally elongated slit;
    the elongated slit curved concave relative to the circumferential surface and having a radially inward side, a radially outward side, and two ends that are respectively spaced apart from the circumferential surface by two bridges thereby to form a rotor center core section located circumferentially between the bridges and located radially between the radially outward side of the slit and the outer circumferential surface of the rotor core, each of the bridges having a thicker portion and a thinner portion that are respectively positioned near the radially inward and outward sides; and
    one or more permanent magnets inserted in each of the holes;
    wherein, if there are more than one permanent magnet in each hole, the magnets in each hole are arranged such that each of the magnets is in direct contact with an adjacent magnet so that centrifugal forces imparted on a center portion of the magnets is transferred through outer portions of the magnets to the bridges.

2. The permanent magnet rotor as recited in claim 1, wherein each of the elongated slits has a generally U-shape, a V-shape, or an arc-shape.

3. The permanent magnet rotor as recited in claim 1, wherein the elongated slit has a U-shape and three permanent magnets are inserted in each of the holes and interlock each other during rotation.

4. The permanent magnet rotor as recited in claim 3, wherein each of the permanent magnets has a trapezoidal cross section.

5. The permanent magnet rotor as recited in claim 1, wherein the elongated slit has a V-shape and two permanent magnets are inserted in each of the holes and interlock each other during rotation.

6. The permanent magnet rotor as recited in claim 5, wherein each of the permanent magnets has a trapezoidal cross section.

7. The permanent magnet rotor as recited in claim 1, wherein the elongated slit has an arc-shape and one permanent magnet is inserted in each of the holes.

8. The permanent magnet rotor as recited in claim 7, wherein each of the permanent magnets has a curve slit-shaped cross section.

9. The permanent magnet rotor as recited in claim 1, wherein the rotor core is formed of a single body.

10. The permanent magnet rotor as recited in claim 1, wherein the rotor core includes a plurality of plates stacked along the rotational axis, each of the plate being punched to form the elongated slit.

11. The permanent magnet rotor as recited in claim 1, wherein the rotor core is made from solid soft magnetic composite material.

12. The permanent magnet rotor as recited in claim 11, wherein the rotor core material selected from the group consisting of Fe, SiFe, NiFe, SiFeCo, and SiFeP, or any material classified as an electrical steel, a soft magnetic composite, or any other material with a magnetic permeability greater than air.

13. The permanent magnet rotor as recited in claim 1, wherein the permanent magnets have rounded corners on the sides of the thinner portions thereby to form gaps between the permanent magnets and the thinner portions.

14. The permanent magnet rotor as recited in claim 1, wherein the bridges have recesses on the sides of the thinner portions thereby to form gaps between the permanent magnets and the thinner portions.

15. The permanent magnet rotor as recited in claim 14, wherein the gaps are filled with air or structural adhesive.

16. The permanent magnet rotor as recited in claim 1, wherein the permanent magnets are arranged to prevent a contact between the permanent magnets and the radially outward side of the elongated slit during rotation.

17. The permanent magnet rotor as recited in claim 1, wherein the one or more permanent magnets are attached to a corresponding one of the holes by glue.

18. An electrical motor, comprising:
    a stator having a generally hollow cylindrical shape with an inner circumferential surface and including one or more coils coupled to a power source;
    a rotor core positioned within the inner circumferential surface of the stator and having a generally cylindrical shape with an outer circumferential surface and a rotational axis, the outer circumferential surface being positioned coaxially with respect to the inner surface of the stator in a spaced apart relationship;
    a plurality of magnet insertion holes formed in the rotor core and arranged circumferentially at a preset angular interval about the rotational axis, each hole extending in a direction parallel to the rotational axis and having a cross section of a generally elongated slit;
    the elongated slit curved concave relative to the outer circumferential surface and having a radially inward side, a radially outward side, and two ends that are respectively spaced apart from the outer circumferential surface by two bridges, each of the bridges having a thicker portion and a thinner portion that are respectively positioned near the radially inward and outward sides; and
    one or more permanent magnets inserted in each of the holes and arranged to transfer a centrifugal force from a center portion of the permanent magnets to portions of the bridges,
    wherein the rotor core rotates along the rotational axis when the power source provides an electrical current to the coils.

19. The electrical motor as recited in claim 18, wherein the motor is a permanent magnet reluctance (PMR) motor.

20. A permanent magnet rotor, comprising:
    a rotor core having a generally cylindrical shape with an outer circumferential surface and a rotational axis;
    a plurality of magnet insertion holes formed in the rotor core and arranged circumferentially at a preset angular interval about the rotational axis, each hole extending in a direction parallel to the rotational axis and having a cross section of a generally elongated slit;

the elongated slit curved concave relative to the circumferential surface and having a radially inward side, a radially outward side, and two ends that are respectively spaced apart from the circumferential surface by two bridges, each of the bridges having a thicker portion and a thinner portion that are respectively positioned near the radially inward and outward sides; and a center magnet and two outer magnets inserted in each of the holes, each of the center and outer magnets having a generally trapezoidal cross section, each of the two outer magnets having a first non-parallel side in contact with a non-parallel side of the center magnet and a second non-parallel side in contact with one of the bridges.

21. The permanent magnet rotor as recited in claim 20, wherein the rotor core is formed of a single body.

22. The permanent magnet rotor as recited in claim 20, wherein the rotor core includes a plurality of plates stacked along the rotational axis, each of the plate being punched to form the elongated slit.

23. The permanent magnet rotor as recited in claim 20, wherein the rotor core is made of material selected from the group consisting of Fe, SiFe, SiFeCo, and SiFeP.

24. The permanent magnet rotor as recited in claim 20, wherein the outer magnets have rounded corners on the sides of the thinner portions thereby to form gaps between the outer magnets and the thinner portions.

25. The permanent magnet rotor as recited in claim 20, wherein the bridges have recesses on the sides of the thinner portions thereby to form gaps between the permanent magnets and the thinner portions.

26. The permanent magnet rotor as recited in claim 25, wherein the gaps are filled with air or structural adhesive.

27. A method of operating a rotor according to claim 20, comprising:

mounting the rotor within a stator operative to impart a rotational force on the rotor upon receipt of electrical power;

providing electrical power to the stator to cause the rotor to rotate with respect to the rotational axis and thereby to impart centrifugal force on the center magnet; and transmitting the centrifugal force through the outer magnets to portions of the bridges.

28. The method as recited in claim 27, wherein the outer magnets have rounded corners on the sides of the thinner portions thereby to form gaps between the outer magnets and the thinner portions.

29. The method as recited in claim 27, wherein the rotor core includes a plurality of plates stacked along the rotational axis, each of the plate being punched to form the elongated slit.

30. The method as recited in claim 27, wherein the rotor core is formed of solid soft magnetic composite material.

\* \* \* \* \*